United States Patent
Ohtomo et al.

(10) Patent No.: US 10,107,912 B2
(45) Date of Patent: Oct. 23, 2018

(54) ELECTRO-OPTICAL DISTANCE METER

(71) Applicant: Kabushiki Kaisha TOPCON, Tokyo-to (JP)

(72) Inventors: Fumio Ohtomo, Saitama (JP); Kaoru Kumagai, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 310 days.

(21) Appl. No.: 15/051,708

(22) Filed: Feb. 24, 2016

(65) Prior Publication Data

US 2016/0266254 A1 Sep. 15, 2016

(30) Foreign Application Priority Data

Mar. 11, 2015 (JP) ................................. 2015-048712

(51) Int. Cl.
*G01C 3/08* (2006.01)
*G01S 17/32* (2006.01)
(Continued)

(52) U.S. Cl.
CPC .......... *G01S 17/325* (2013.01); *G01S 7/4915* (2013.01); *G01S 17/102* (2013.01); *G01S 17/36* (2013.01); *G01S 7/497* (2013.01)

(58) Field of Classification Search
CPC .... G01S 17/325; G01S 7/4915; G01S 17/102; G01S 17/36; G01S 7/497
See application file for complete search history.

(56) References Cited

U.S. PATENT DOCUMENTS

| 4,413,904 A | 11/1983 | Hamada et al. |
| 2004/0145723 A1 | 7/2004 | Ohtomo |
| 2016/0259039 A1 | 9/2016 | Ohtomo et al. |

FOREIGN PATENT DOCUMENTS

| DE | 4303804 A1 | 8/1994 |
| GB | 2336493 A | 10/1999 |

(Continued)

OTHER PUBLICATIONS

Europan communication dated Aug. 1, 2016 in co-pending European patent application No. 16517707.7.
(Continued)

*Primary Examiner* — Samantha K Abraham
(74) *Attorney, Agent, or Firm* — Nields, Lemack & Frame, LLC

(57) ABSTRACT

The invention provides an electro-optical distance meter, which comprises a light emitting element for emitting a distance measuring light, signal generators for generating two or more proximity frequencies, intermittent pulse generators for generating a modulation signal in which the two or more proximity frequencies are intermitted respectively and converted to pulses with a predetermined width, a projecting optical system for sequentially switching over and projecting intermittent modulated distance measuring light as converted to pulses with predetermined width by the modulation signal, a photodetection unit for receiving a reflected distance measuring light from an object to be measured and producing an intermittent photodetection signal with a predetermined pulse width, other signal generators for generating frequency signals having a difference of a predetermined frequency with respect to the proximity frequency respectively, a frequency converting unit for performing frequency conversion by mixing the intermittent photodetection signals from the photodetection unit to a difference frequency and the frequency signals and for obtaining a signal column of intermittent conversion signals having a predetermined pulse width corresponding to each difference frequency respectively and changing by corresponding to each difference frequency respectively, and an arithmetic control unit, wherein the arithmetic control unit is configured so as to intermit the proximity frequencies so that the pulse width of the intermittent modulated distance (Continued)

measuring light will be shorter than a period of the difference frequency, to calculate difference frequency waveforms with respect to each of the intermittent conversion signals respectively, to calculate a precise measurement distance value by obtaining a phase from a waveform of at least one cycle of the difference frequency, to calculate a coarse measurement distance value by obtaining a phase difference between the relative difference frequencies and to determine a distance by combining the coarse measurement distance value and the precise measurement distance value.

16 Claims, 3 Drawing Sheets

(51) Int. Cl.
*G01S 17/10* (2006.01)
*G01S 17/36* (2006.01)
*G01S 7/491* (2006.01)
*G01S 7/497* (2006.01)

(56) References Cited

FOREIGN PATENT DOCUMENTS

| JP | 5-232232 A | 9/1993 |
|----|------------|--------|
| JP | 2004-219285 A | 8/2004 |

OTHER PUBLICATIONS

European communication dated Aug. 5, 2016 in corresponding European patent application No. 16157710.1.
Office action dated Mar. 7, 2018 in co-pending U.S. Appl. No. 15/051,706.
Notice of allowance dated Jul. 2, 2018 in co-pending U.S. Appl. No. 15/051,706.

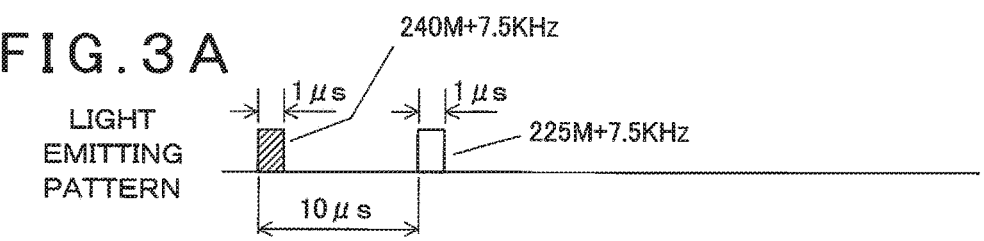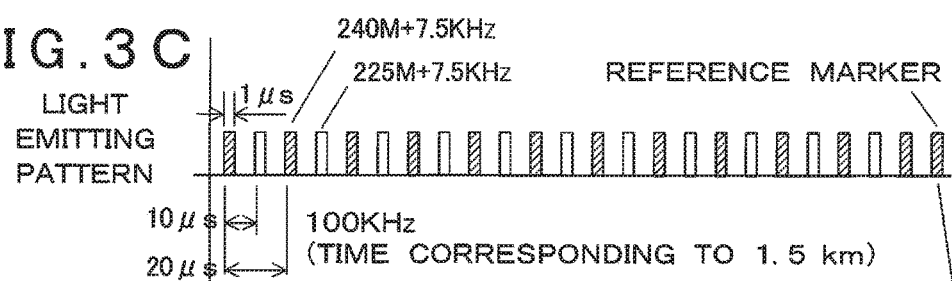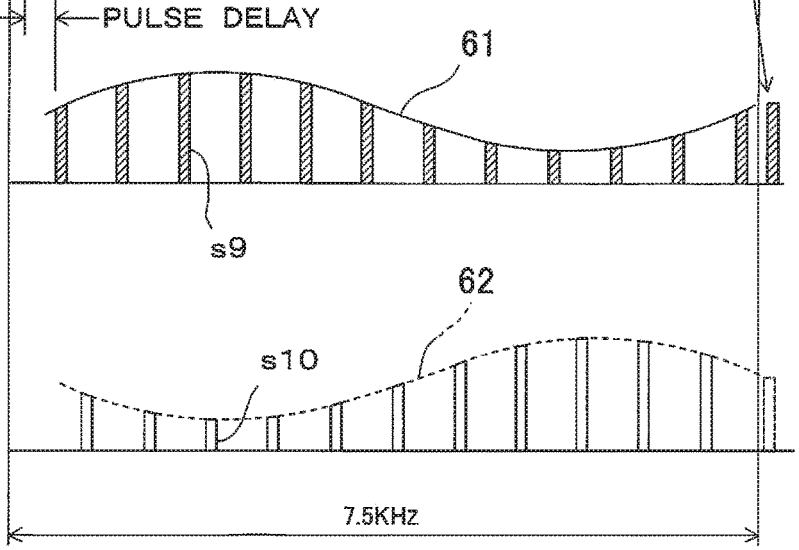

ELECTRO-OPTICAL DISTANCE METER

BACKGROUND OF THE INVENTION

The present invention relates to an electro-optical distance meter, which projects a modulated measuring light to an object to be measured, receives a reflected measuring light from the object to be measured and measures a distance to the object to be measured by a phase difference between the measuring light and the reflected measuring light.

In the electro-optical distance meter which perform a distance measurement by detecting the phase difference between the measuring light and the reflected measuring light, a distance as measurable and a measurement accuracy are determined by a modulated frequency. For this reason, in order to make measuring from a near distance to a long distance possible, it is necessary to project a distance measuring light with a plurality of modulated frequencies.

For instance, modulated frequency of 30 MHz, a modulated frequency of 300 KHz, and further, frequencies of 30 MHz-3 KHz and 300 KHz-3 KHz are prepared. Distance measuring lights are emitted each with modulated frequency of 30 MHz and a modulated frequency of 300 KHz respectively, and reflected distance measuring lights having a modulated frequency of 30 MHz and a modulated frequency of 300 KHz are received, and further, frequencies of 30 MHz-3 KHz and 300 KHz-3 KHz from photodetection signals are mixed. Thereby, it is possible to perform an electro-optical distance measurement from a near distance to a long distance by detecting a difference frequency signal of 3 KHz and by detecting a phase difference respectively.

In a conventional electro-optical distance meter, since a plurality of frequencies are prepared, distance measuring light is projected per each plurality of frequencies, and distance measurement is performed, there have been problems in that a circuit arrangement becomes complicated and measurement time becomes longer.

SUMMARY OF THE INVENTION

It is an object of the present invention to provide an electro-optical distance meter, by which it is possible to efficiently prepare signals required for measurement and to perform measurement within a short time.

To attain the object as described above, an electro-optical distance meter according to the present invention comprises a light emitting element for emitting a distance measuring light, signal generators for generating two or more proximity frequencies, intermittent pulse generators for generating a modulation signal in which the two or more proximity frequencies are intermitted respectively and converted to pulses with a predetermined width, a projecting optical system for sequentially switching over and projecting intermittent modulated distance measuring light as converted to pulses with predetermined width by the modulation signal, a photodetection unit for receiving a reflected distance measuring light from an object to be measured and producing an intermittent photodetection signal with a predetermined pulse width, other signal generators for generating frequency signals having a difference of a predetermined frequency with respect to the proximity frequency respectively, a frequency converting unit for performing frequency conversion by mixing the intermittent photodetection signals from the photodetection unit to a difference frequency and the frequency signals and for obtaining a signal column of intermittent conversion signals having a predetermined pulse width corresponding to each difference frequency respectively and changing by corresponding to each difference frequency respectively, and an arithmetic control unit, wherein the arithmetic control unit is configured so as to intermit the proximity frequencies so that the pulse width of the intermittent modulated distance measuring light will be shorter than a period of the difference frequency, to calculate difference frequency waveforms with respect to each of the intermittent conversion signals respectively, to calculate a precise measurement distance value by obtaining a phase from a waveform of at least one cycle of the difference frequency, to calculate a coarse measurement distance value by obtaining a phase difference between the relative difference frequencies and to determine a distance by combining the coarse measurement distance value and the precise measurement distance value.

Further, in the electro-optical distance meter according to the present invention, the arithmetic control unit generates the intermittent modulated distance measuring light as a light emitting pattern to go one round in a predetermined number of intermittence, integrates the intermittent conversion signal by two or more times per each light emitting pattern, obtains an average phase of each of the intermittent conversion signals from integrated waveforms as obtained, obtains the precise measurement distance value from the average phase, obtains the coarse measurement distance value from the average phase difference of each of the mutual two or more intermittent conversion signals, and determines a distance to the object to be measured according to the precise measurement distance value and the coarse measurement distance value.

Further, in the electro-optical distance meter according to the present invention, a switching order of two or more of the intermittent modulated distance measuring light is changed, and a position as changed is set as a reference position of a phase measurement.

Further, in the electro-optical distance meter according to the present invention, the arithmetic control unit calculates a long distance measurement value based on a delay time of the intermittent photodetection signal of the reflected distance measuring light.

Furthermore, in the electro-optical distance meter according to the present invention, the arithmetic control unit produces an abnormal signal in a case where the difference between the precise measurement distance value and the coarse measurement distance value is not within a predetermined value.

According to the present invention, the electro-optical distance meter comprises a light emitting element for emitting a distance measuring light, signal generators for generating two or more proximity frequencies, intermittent pulse generators for generating a modulation signal in which the two or more proximity frequencies are intermitted respectively and converted to pulses with a predetermined width, a projecting optical system for sequentially switching over and projecting intermittent modulated distance measuring light as converted to pulses with predetermined width by the modulation signal, a photodetection unit for receiving a reflected distance measuring light from an object to be measured and producing an intermittent photodetection signal with a predetermined pulse width, other signal generators for generating frequency signals having a difference of a predetermined frequency with respect to the proximity frequency respectively, a frequency converting unit for performing frequency conversion by mixing the intermittent photodetection signals from the photodetection unit to a difference frequency and the frequency signals and for obtaining a signal column of intermittent conversion signals having a predetermined pulse width corresponding to each difference frequency respectively and changing by corresponding to each difference frequency respectively, and an arithmetic control unit, wherein the arithmetic control unit is configured so as to intermit the proximity frequencies so that the pulse width of the intermittent modulated distance measuring light will be shorter than a period of the difference frequency, to calculate difference frequency waveforms with respect to each of the intermittent conversion signals respectively, to calculate a precise measurement distance value by obtaining a phase from a waveform of at least one cycle of the difference frequency, to calculate a coarse measurement distance value by obtaining a phase difference between the relative difference frequencies and to determine a distance by combining the coarse measurement distance value and the precise measurement distance value. As a result, a circuit arrangement becomes simple, a measurement time is shortened, and further, by setting the distance measuring light as an intermittent light, a time alone, when light output is modulated, can be concentrated on, a peak power can be increased, and since a light emitting duration is shortened, an electrical and an optical noise due to light emission is reduced, an S/N ratio is improved and a distance measurement accuracy is improved.

Further, according to the present invention, in the electro-optical distance meter, the arithmetic control unit generates the intermittent modulated distance measuring light as a light emitting pattern to go one round in a predetermined number of intermittence, integrates the intermittent conversion signal by two or more times per each light emitting pattern, obtains an average phase of each of the intermittent conversion signals from integrated waveforms as obtained, obtains the precise measurement distance value from the average phase, obtains the coarse measurement distance value from the average phase difference of each of the mutual two or more intermittent conversion signals, and determines a distance to the object to be measured according to the precise measurement distance value and the coarse measurement distance value. As a result, phase measurement can be performed in easier manner.

Further, according to the present invention, in the electro-optical distance meter, a switching order of two or more of the intermittent modulated distance measuring light is changed, and a position as changed is set as a reference position of a phase measurement. As a result, phase measurement can be performed in easier manner.

Further, according to the present invention, in the electro-optical distance meter, the arithmetic control unit calculates a long distance measurement value based on a delay time of the intermittent photodetection signal of the reflected distance measuring light. As a result, generating of a modulated frequency for a coarse measurement is not necessary and the circuit arrangement becomes simple.

Furthermore, according to the present invention, in the electro-optical distance meter, the arithmetic control unit produces an abnormal signal in a case where the difference between the precise measurement distance value and the coarse measurement distance value is not within a predetermined value. As a result, an abnormal measurement value can be eliminated and a reliability of the measurement is improved.

BRIEF DESCRIPTION OF THE DRAWINGS

FIG. 3A is an explanatory drawing to show a condition where a distance measuring light is pulsed, FIG. 3B is an explanatory drawing to show a photodetection signal, FIG. 3C is an explanatory drawing to show a light emitting pattern, and FIG. 3D and FIG. 3E are explanatory drawings to show a condition of an intermittent conversion signal after a mixing, respectively.

DETAILED DESCRIPTION OF THE PREFERRED EMBODIMENTS

A description will be given below on an embodiment of the present invention by referring to the attached drawings.

First, referring to FIG. 1, a description will be given on a distance measuring optical system 1 of an electro-optical distance meter according to an embodiment of the present invention.

Figure 1:
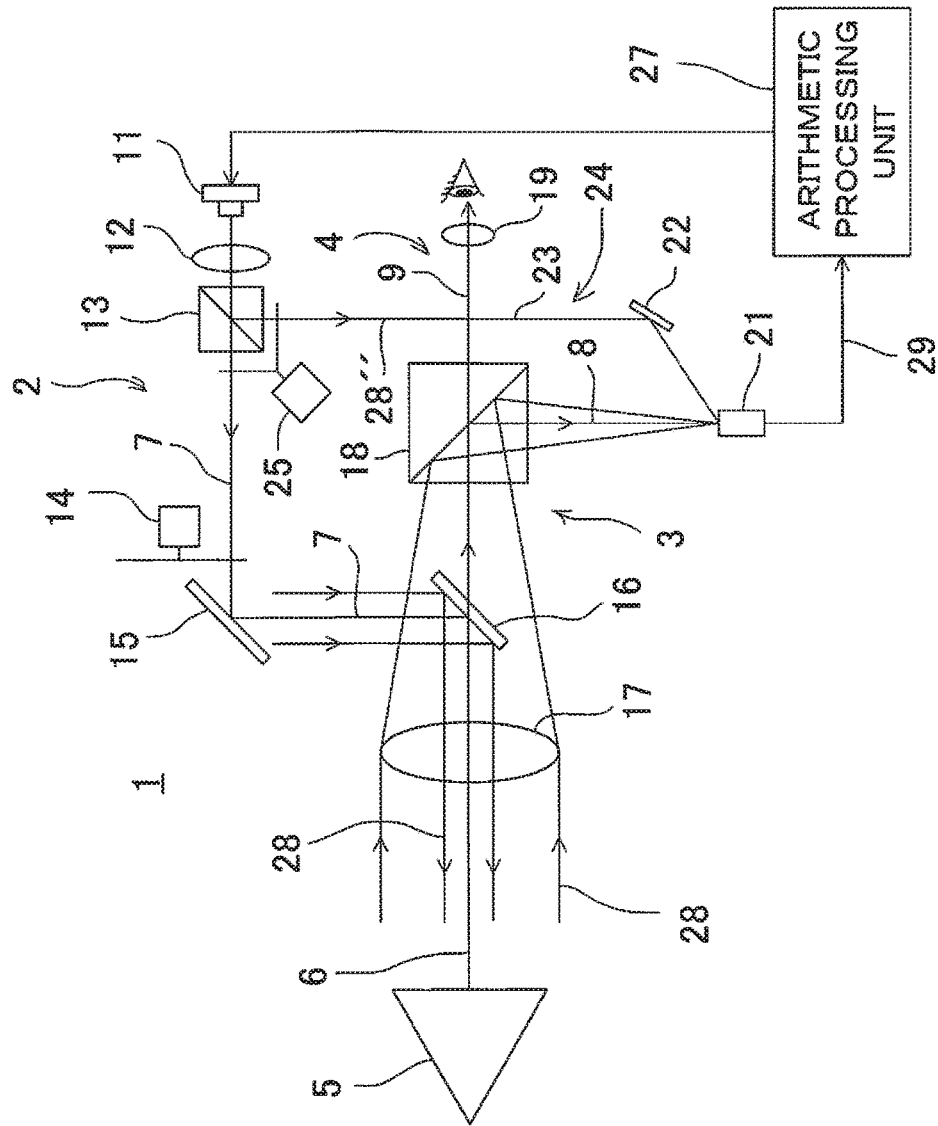
FIG. 1 is a schematical drawing of an optical system of an electro-optical distance meter according to the present embodiment.

In FIG. 1, the distance measuring optical system 1 comprises a projecting optical system 2, a photodetecting optical system 3 and a sighting optical system 4. Further, FIG. 1 shows that an object to be measured 5 is a prism as a retro-reflector.

The distance measuring optical system 1 has a distance measuring optical axis 6 directed to the object to be measured 5 and the projecting optical system 2 has a projecting optical axis 7, the photodetecting optical system 3 has a photodetection optical axis 8, and the sighting optical system 4 has a sighting optical axis 9.

Along the projecting optical axis 7, a light emitting element 11, a condenser lens 12, a half mirror 13 and a light quantity adjuster 14 are arranged. Further, along the projecting optical axis 7, deflection mirrors 15 and 16 are arranged and the projecting optical axis 7 is deflected by the deflection mirrors 15 and 16 so as to coincide with the distance measuring optical axis 6.

The light emitting element 11 is a laser diode, for instance, and emits an invisible light as a distance measuring light.

Along the distance measuring optical axis 6, an objective lens 17 and a dichroic mirror 18 are provided. The dichroic mirror 18 is adapted so as to allow a visible light to pass through and reflect a distance measuring light. A part where the distance measuring optical axis 6 passes through the dichroic mirror 18 is the sighting optical axis 9, and an ocular lens 19 is provided along the sighting optical axis 9.

The objective lens 17, the dichroic mirror 18, the ocular lens 19, etc. make up together the sighting optical system 4.

The condenser lens 12, the half mirror 13, the light quantity adjuster 14, the deflection mirrors 15 and 16, the objective lens 17, etc. make up together the projecting optical system 2.

A part where the distance measuring optical axis 6 is reflected by the dichroic mirror 18 is the photodetection optical axis 8, and a photodetection element 21 is provided along the photodetection optical axis 8.

The objective lens 17, the dichroic mirror 18, etc. make up together the photodetecting optical system 3.

A reflection optical axis of the half mirror 13 is guided to the photodetection element 21 as an internal reference optical axis 23 via a reflection mirror 22. The half mirror 13 and the reflection mirror 22 make up together an internal reference optical system 24.

An optical path switching unit 25 is spanned between the projecting optical axis 7 and the internal reference optical axis 23. The optical path switching unit 25 alternatively shuts off or opens the projecting optical axis 7 or the internal reference optical axis 23. The optical path switching unit 25 is configured so as to select that a distance measuring light passing through the half mirror 13 is projected or that one part of the distance measuring light as reflected by the half mirror 13 is projected to the internal reference optical system 24.

The light emitting element 11 and the photodetection element 21 are electrically connected to the arithmetic processing unit 27 respectively.

A description will be given below on an operation of the distance measuring optical system 1.

A distance measuring light 28 as modulated is emitted from the light emitting element 11. The distance measuring light 28 as turned to a parallel luminous flux by the condenser lens 12 is projected toward the object to be measured 5 by passing through a central part of the objective lens 17 after the light quantity is adjusted by the light quantity adjuster 14.

The distance measuring light as reflected by the object to be measured 5 enters the objective lens 17 as a reflected distance measuring light 28', is condensed by the objective lens 17 and is reflected by the dichroic mirror 18 and enters the photodetection element 21. The reflected distance measuring light 28' is received by the photodetection element 21 and the photodetection element 21 produces an intermittent photodetection signal 29 (to be described later).

After being emitted by the light emitting element 11, a part of the distance measuring light 28 (an internal reference light 28") is reflected by the half mirror 13. When the internal reference optical axis 23 is opened due to an optical path switch-over by the optical path switching unit 25, the internal reference light 28" enters the photodetection element 21. The photodetection element 21 produces a photodetection signal of the internal reference light 28".

A visible light, which enters the dichroic mirror 18 via the objective lens 17, passes through the dichroic mirror 18 and is condensed by the ocular lens 19. A surveying operator can sight the object to be measured 5 via the ocular lens 19.

The arithmetic processing unit 27 drives the light emitting element 11 and makes the light emitting element 11 to emit a modulated light. Further, the arithmetic processing unit 27 determines a distance to the object to be measured 5 based on an intermittent photodetection signal 29 of the reflected distance measuring light 28' as inputted from the photodetection element 21, and determines an optical path length of the internal reference optical system 24 based on an intermittent photodetection signal 29 of the internal reference light 28". A final measurement value is obtained as a difference between a measurement result based on the reflected distance measuring light 28' and a measurement result of the internal reference light 28". By obtaining the difference between the measurement result of the reflected distance measuring light 28' and the measurement result of the internal reference light 28", an influence due to drifting of the electric circuit can be eliminated.

Next, by referring to FIG. 2, a description will be given on the arithmetic processing unit 27.

Figure 2:
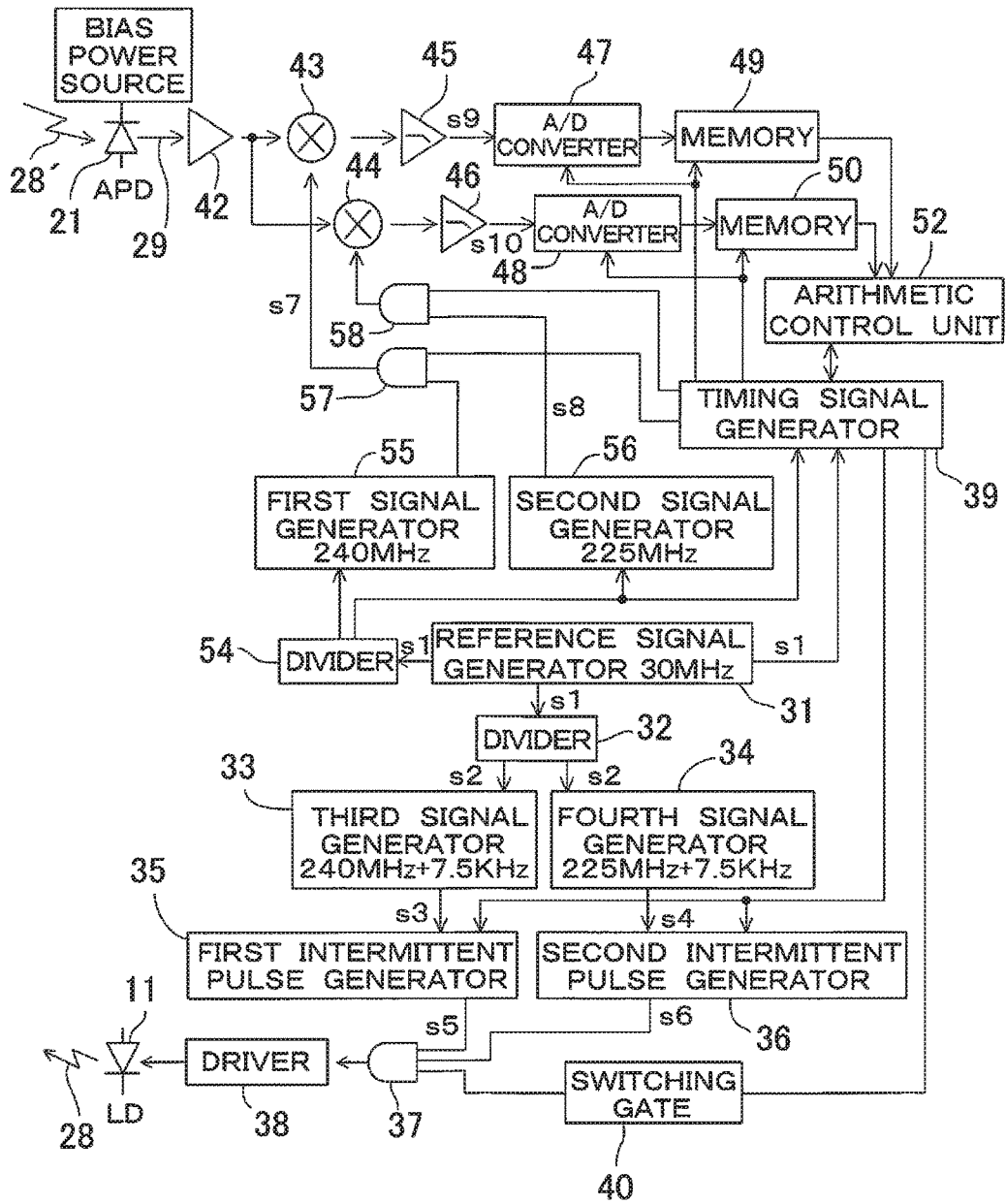
FIG. 2 is a schematical drawing of a measuring circuit of the electro-optical distance meter according to the present embodiment.

In FIG. 2, what are equivalent to components as shown in FIG. 1 are referred by the same symbol, and detailed description thereof will not be given here.

A reference signal generator 31 generates a reference frequency signal s1 of a predetermined frequency. The numerical values as shown below can be adequately changed, depending on a measurement distance and a measurement accuracy. For instance, in the description as given below, 240 MHz is regarded as a reference frequency.

With respect to the reference frequency signal s1 as issued from the reference signal generator 31, 30 MHz is divided to 1/4000 by a divider 32, and a divided frequency signal s2 of 7.5 KHz is generated. The divided frequency signal s2 is inputted to a third signal generator 33 and a fourth signal generator 34.

Further, the reference frequency signal s1 as issued from the reference signal generator 31 is divided to ½ by a divider 54 and inputted to a first signal generator 55 and a second signal generator 56 as a divided frequency signal of 15 MHz. In the first signal generator 55, a frequency signal of 240 MHz is generated based on the divided frequency signal of 15 MHz. In the second signal generator 56, a frequency signal of 225 MHz is generated based on the divided frequency signal of 15 MHz.

In the third signal generator 33, a first modulation signal s3 of 240 MHz+7.5 KHz is generated by the divided frequency signal s2 and a reference signal of 30 MHz and is outputted to a first intermittent pulse generator 35.

Further, in the fourth signal generator 34, a second modulation signal s4 of 225 MHz+7.5 KHz is generated by the divided frequency signal s2 and the reference signal of 30 MHz and is outputted to a second intermittent pulse generator 36.

By the third signal generator 33 and the fourth signal generator 34, two modulation signals having close frequencies, i.e. 240 MHz+7.5 KHz (s3) and 225 MHz+7.5 KHz (s4), are generated.

In the first intermittent pulse generator 35, based on a timing signal from a timing signal generator 39 (to be described later), the first modulation signal s3, which is a continuous signal, is converted to an intermittent signal as issued per predetermined time interval by a predetermined time duration. That is, the first modulation signal s3 of continuous signal is changed to a pulse signal. A first pulse modulation signal s5 as pulsed is inputted from the first intermittent pulse generator 35 to an AND circuit 37.

Therefore, in the pulses of the first pulse modulation signal s5, the frequency of 240 MHz+7.5 KHz is included, and the pulse is constituted of the frequency of 240 MHz+7.5 KHz.

Similarly, in the second intermittent pulse generator 36, based on the timing signal from the timing signal generator 39, the second modulation signal s4, which is a continuous signal, is converted to an intermittent signal, which is issued per predetermined time interval by a predetermined time duration and is changed to a pulse signal. A second pulse modulation signal s6 as pulsed is inputted from the second intermittent pulse generator 36 to the AND circuit 37. Also, regarding a pulse of the second pulse modulation signal s6, similarly to the first pulse modulation signal s5, the frequency of 225 MHz+7.5 KHz is included, and the pulse is constituted of the frequency of 225 MHz+7.5 KHz.

The reference frequency signal s1 generated by the reference signal generator 31 is also inputted to the timing signal generator 39. The timing signal generator 39 generates various types of timing signals based on the reference frequency signal s1.

The timing signal generator 39 sends timing signals to the first intermittent pulse generator 35 and the second intermittent pulse generator 36 and controls in such a manner that the first pulse modulation signal s5 and the second pulse modulation signal s6 from the second intermittent pulse generator 36 are outputted, alternately and at a predetermined time interval.

Further, the timing signal from the timing signal generator 39 is inputted to a switching gate 40. A switching signal is inputted to the AND gate 37 from the switching gate 40.

In response to the switching signal from the switching gate 40, the AND circuit 37 outputs the first pulse modulation signal s5 and the second pulse modulation signal s6 to a driver 38 alternately.

As shown in FIG. 3A, the driver 38 drives the light emitting element 11 based on the first pulse modulation signal s5 and the second pulse modulation signal s6. The driver 38 makes the light emitting element 11 to emit the distance measuring light modulated at 240 MHz+7.5 KHz and the distance measuring light modulated at 225 MHz+7.5 KHz alternately, at a predetermined time duration and at a predetermined time interval respectively (see FIG. 3C).

The light emitting element 11 emits a distance measuring light 28 intermittently and the distance measuring light 28 becomes a pulsed light. Further, the pulsed lights emitted alternately is constituted of a modulation light of 240 MHz+7.5 KHz and a modulation light of 225 MHz+7.5 KHz respectively (hereinafter referred as a pulse modulation light).

FIG. 3C shows a condition where a pulse modulation light of 240 MHz+7.5 KHz and a pulse modulation light of 225 MHz+7.5 KHz are emitted alternately. Further, in the present embodiment, a pulse width of the pulse modulation light is set to 1 µs, a pulse interval of the pulse modulation light 240 MHz+7.5 KHz itself and the pulse modulation light 225 MHz+7.5 KHz itself are set to 20 µs respectively, and further, a time interval between the pulse modulation light 240 MHz+7.5 KHz and the pulse modulation light 225 MHz+7.5 KHz is set to 10 µs.

Further, as the distance measuring light 28 is emitted intermittently, i.e. by pulse emitting, a light emitting duty ratio of the light emitting element (a laser diode (LD)) 11 is decreased. Since a peak value can be increased by the decreasing amount of the light emitting duty ratio, a light intensity of the distance measuring light can be increased without impairing the safety with respect to an eye, and a long distance measurement becomes possible. It is to be noted that the predetermined time duration and the predetermined time interval can be adequately selected depending on a measuring condition.

The distance measuring light 28 is emitted towards the object to be measured 5, reflected by the object to be measured 5 and is received by the photodetection element 21 via the photodetecting optical system 3. The photodetection element 21 produces an intermittent photodetection signal 29. As the photodetection element to be used, a photodiode, and further, an avalanche photodiode (APD) is used, for instance.

Further, an optical path is switched over by the optical path switching unit 25 and one part of the distance measuring light 28 is received by the photodetection element 21 as an internal reference light 28" via the internal reference optical system 24. It is to be noted that since a processing of the photodetection signal when the reflected distance measuring light 28' is received is similar to the processing of the photodetection signal for the internal reference light 28", a description will be given below on the processing of the photodetection signal of the reflected distance measuring light 28'.

The photodetection element 21 alternately receives a pulse modulation light of 240 MHz+7.5 KHz and a pulse modulation light of 225 MHz+7.5 KHz as a reflected distance measuring light 28'. Therefore, the photodetection signal of the photodetection element 21 becomes a pulse output and becomes an intermittent photodetection signal 29 having frequencies of 240 MHz+7.5 KHz and 225 MHz+7.5 KHz inside the pulse.

FIG. 3B shows a generating condition of the photodetection signal. In the photodetection signal, a delay time (pulse delay) occurs, corresponding to the distance between light emitting pulses.

The photodetection signal is amplified by an amplifier 42 and the signal as amplified is inputted to a first mixing circuit 43 and a second mixing circuit 44.

To the first mixing circuit 43, a first signal s7 of 240 MHz is inputted from the first signal generator 55 via an AND circuit 57. In the first mixing circuit 43, a photodetection signal of 240 MHz+7.5 KHz and the first signal s7 of 240 MHz are mixed together. By being mixed together, frequencies are converted, and signals having a frequency of (240 MHz+240 MHz+7.5 KHz) and a frequency of 7.5 KHz are obtained. The signal is a difference frequency signal in a pulsed condition since the signal corresponds to the pulse modulation light of 240 MHz+7.5 KHz.

In the intermittent conversion signal after the mixing, high frequencies are removed via a low-pass filter 45, a difference frequency signal (a first intermittent conversion signal s9) having a frequency of 7.5 KHz is obtained and the difference frequency signal is inputted to an A/D converter 47. Sampling of the difference frequency signal is performed and is stored in a memory 49. A timing of sampling and a timing of storage to the memory 49 are controlled by a timing signal as inputted from the timing signal generator 39.

Here, since low-pass filters to be used as the low-pass filter 45 and the low-pass filter 46 (to be described later) correspond respectively to 7.5 KHz, one type will suffice, and the circuit arrangement can be simplified. Further, since the modulated frequency used as reference are also close to each other as 240 MHz and 225 MHz, the circuit arrangement can be simplified.

Similarly, to the second mixing circuit 44, a second signal s8 of 225 MHz is inputted from the second signal generator 56 via an AND circuit 58. In the second mixing circuit 44, a photodetection signal of 225 MHz+7.5 KHz and the second signal s8 of 225 MHz are mixed together. By being mixed together, frequencies are converted, and signals having a frequency of (225 MHz+225 MHz+7.5 KHz) and a frequency of 7.5 KHz are obtained. The signal is a difference frequency signal in a pulsed condition since the signal corresponds to the pulse modulation light of 225 MHz+7.5 KHz.

In the intermittent conversion signal after the mixing, high frequency is removed via the low-pass filter 46, a difference frequency signal having a frequency of 7.5 KHz is obtained and the difference frequency signal is inputted to an A/D converter 48. Sampling of the difference frequency signal is performed and is stored in a memory 50. A timing of sampling and a timing of storage to the memory 50 are controlled by a timing signal as inputted from the timing signal generator 39.

FIG. 3D and FIG. 3E show, in time series, the first intermittent conversion signal s9 and the second intermittent conversion signal s10 as sampled.

As described above, since the pulse duration of the pulse modulation light is set to 1 µs, a pulse duration of the first intermittent conversion signal s9 and the second intermittent conversion signal s10 are also set to 1 µs. This pulse duration is extensively smaller than one cycle of the difference frequency as obtained by mixing, and a peak value of each of the first intermittent conversion signal s9 and the second intermittent conversion signal s10 changes corresponding to the variation of the difference cycle, i.e. the variation of 7.5 KHz.

Therefore, by obtaining curves, which envelop peak values of each of the first intermittent conversion signal s9 and the second intermittent conversion signal s10 respectively, signal waveforms 61 and 62 of the difference frequency (7.5 KHz) can be obtained.

An arithmetic control unit 52 calculates the signal waveform 61 and the signal waveform 62 from a sampling data as stored in the memory 49 and the memory 50 respectively. Further, a phase is obtained respectively from both the signal waveforms 61 and 62, and a distance is calculated, corresponding to both the signal waveforms 61 and 62 from the phase and the light velocity. Distance measurement based on the phase is executed as a precise measurement.

A coarse measurement distance value can be obtained by calculating the difference between the phase of 240 MHz+ 7.5 KHz and the phase of 225 MHz+7.5 KHz. The phase difference between the two phases is equivalent to a case where measured based on the difference of the intermittent modulation frequency, i.e. 15 MHz. When each of the phase is supposed as φ1 and φ2 respectively, since in a case where the frequency difference is 15 MHz, a wavelength is 10 m. Thus, if it is supposed that the coarse measurement distance value to be obtained is "d", it is expressed as:

$$d=10\ m\times(\phi1-\phi2)/2\pi$$

and the coarse measurement distance value up to 10 m can be obtained. A distance value can be obtained by combining a precise measurement distance value and the coarse measurement distance value.

Further, in a case where the distance is calculated by obtaining the phase from the signal waveform 61 or the signal waveform 62, the distance is calculated for a predetermined number of cycles depending on the measurement accuracy, and the results are averaged. Further, by further averaging the distances as calculated for each of the signal waveforms 61 and 62, the accuracy is improved.

In the embodiment as described above, FIG. 3C shows that a condition where the pulse modulation light of 240 MHz+7.5 KHz and the pulse modulation light of 225 MHz+7.5 KHz are alternately emitted, while the light emitting pattern may be changed so that the reference position of the cycle (or a starting position of the cycle) can be found per each one cycle of the difference cycle or per each plurality of cycles. For instance, at the start of the cycle, the pulse modulation light of 240 MHz+7.5 KHz is emitted continuously twice. As a result, enables a one round of the starting position to be detected.

Further, regarding the one round, the one round may be set based on the number of pulses, or may be set in such a manner that a predetermined number of pulses carry out the one round.

Since the reference position of the round trip is clearly determined when averaging is performed on the phase by a number of round trips as required, a signal processing becomes easy.

Next, based on the delay time at the time of light receiving of a distance measuring light pulse, the measurement of a longer distance can be performed by the coarse measurement.

Between the timing when the light emitting pulse is emitted and the timing when the photodetection signal is issued, a pulse delay corresponding to the measurement distance, a time delay corresponding to the time of a round trip of the distance measuring light pulses occurs.

Therefore, by measuring the pulse delay time, a distance measurement according to a TOF (Time of Flight) method can be performed.

The arithmetic control unit 52 measures the pulse delay time and performs the coarse measurement based on the pulse delay time and the light velocity.

Further, the arithmetic control unit 52 compares the precise measurement value with the coarse measurement value or with a long distance measurement value, and in a case where the difference between the two values is not within a predetermined value, a notifying means (not shown) such as a display unit, an alarm device, etc., is operated and an abnormality signal is issued.

Further, in the TOF method, by adequately setting the time of one round of the light emitting pattern, a measurable distance can be set up. That is, in a case where one round of the light emitting pattern is set to a cycle of 7.5 KHz or more, e.g. one cycle, a long distance measurement up to 20 km becomes possible.

Therefore, by combining the distance measurement (long distance measurement) according to the TOF method and the distance measurement (precise measurement and coarse measurement) by the phase detection, a highly accurate distance measurement becomes possible from a near distance to a long distance.

Since the long distance measurement by the TOF method can be performed, it is not necessary to further prepare the modulated frequency for the long distance measurement and the circuit arrangement can be simplified. Further, since there is no need to perform the long distance measurement, the coarse measurement and the precise measurement by time division and since the coarse measurement, the precise measurement and the long distance measurement can be measured at the same time, the time for the measurement can be shortened. Further, in the same time for measurement, an extension of the measurement distance can realized.

Further, by changing the reference position to determine the one round, the time for the one round can be changed. Therefore, in the arithmetic control unit 52, the setting of the reference position can be changed and the measurable distance can be changed easily, corresponding to the measurement distance as required.

Further, as described above, since the signal frequencies are closer to each other, i.e. 240 MHz and 225 MHz, the two frequencies can be used for the precise measurement, which contributes to the decrease of the measurement time.

The invention claimed is:

1. An electro-optical distance meter comprising; a light emitting element for emitting a distance measuring light, signal generators for generating two or more proximity frequencies, intermittent pulse generators for generating a modulation signal in which said two or more proximity frequencies are intermitted respectively and converted to pulses with a predetermined width, a projecting optical system for driving said light emitting element and sequentially switching over and projecting intermittent modulated distance measuring light as converted to pulses with predetermined width by said modulation signal, a photodetection unit for receiving a reflected distance measuring light from an object to be measured and producing an intermittent photodetection signal with a predetermined pulse width, other signal generators for generating frequency signals having a difference of a predetermined frequency with respect to said proximity frequency respectively, a frequency converting unit for performing frequency conversion by mixing said intermittent photodetection signals from said photodetection unit and said frequency signals to a difference frequency and for obtaining a signal column of intermittent conversion signals having a predetermined pulse width corresponding to each difference frequency respectively and a changing peak value by corresponding to a variation of each difference frequency respectively, and an arithmetic control unit, wherein said arithmetic control unit is configured so as to intermit said proximity frequencies so that the pulse width of the intermittent modulated distance measuring light will be shorter than a period of the difference frequency, to calculate difference frequency waveforms based on curves which envelop peak values of each of said intermittent conversion signals respectively, to calculate a precise measurement distance value by obtaining a phase from a waveform of at least one cycle of the difference frequency, to calculate a coarse measurement distance value by obtaining a phase difference between said relative difference frequencies and to determine a distance by combining said coarse measurement distance value and said precise measurement distance value.

2. The electro-optical distance meter according to claim 1, wherein said arithmetic control unit generates said intermittent modulated distance measuring light as a light emitting pattern to go one round in a predetermined number of intermittence, integrates said intermittent conversion signal by two or more times per each light emitting pattern, obtains an average phase of each of said intermittent conversion signals from integrated waveforms as obtained, obtains said precise measurement distance value from the average phase, obtains said coarse measurement distance value from the average phase difference of each of said mutual two or more intermittent conversion signals, and determines a distance to said object to be measured according to said precise measurement distance value and said coarse measurement distance value.

3. The electro-optical distance meter according to claim 2, wherein a switching order of two or more of said intermittent modulated distance measuring light is changed, and a position as changed is set as a reference position of a phase measurement.

4. The electro-optical distance meter according to claim 3, wherein said arithmetic control unit calculates a long distance measurement value based on a delay time of said intermittent photodetection signal of said reflected distance measuring light.

5. The electro-optical distance meter according to claim 4, wherein said arithmetic control unit produces an abnormal signal in a case where the difference between said precise measurement distance value and said coarse measurement distance value is not within a predetermined range.

6. The electro-optical distance meter according to claim 3, wherein said arithmetic control unit produces an abnormal signal in a case where the difference between said precise measurement distance value and said coarse measurement distance value is not within a predetermined range.

7. The electro-optical distance meter according to claim 2, wherein said arithmetic control unit calculates a long distance measurement value based on a delay time of said intermittent photodetection signal of said reflected distance measuring light.

8. The electro-optical distance meter according to claim 7, wherein said arithmetic control unit produces an abnormal signal in a case where the difference between said precise measurement distance value and said coarse measurement distance value is not within a predetermined range.

9. The electro-optical distance meter according to claim 2, wherein said arithmetic control unit produces an abnormal signal in a case where the difference between said precise measurement distance value and said coarse measurement distance value is not within a predetermined range.

10. The electro-optical distance meter according to claim 1, wherein a switching order of two or more of said intermittent modulated distance measuring light is changed, and a position as changed is set as a reference position of a phase measurement.

11. The electro-optical distance meter according to claim 10, wherein said arithmetic control unit calculates a long distance measurement value based on a delay time of said intermittent photodetection signal of said reflected distance measuring light.

12. The electro-optical distance meter according to claim 11, wherein said arithmetic control unit produces an abnormal signal in a case where the difference between said precise measurement distance value and said coarse measurement distance value is not within a predetermined range.

13. The electro-optical distance meter according to claim 10, wherein said arithmetic control unit produces an abnormal signal in a case where the difference between said precise measurement distance value and said coarse measurement distance value is not within a predetermined range.

14. The electro-optical distance meter according to claim 1, wherein said arithmetic control unit calculates a long distance measurement value based on a delay time of said intermittent photodetection signal of said reflected distance measuring light.

15. The electro-optical distance meter according to claim 14, wherein said arithmetic control unit produces an abnormal signal in a case where the difference between said precise measurement distance value and said coarse measurement distance value is not within a predetermined range.

16. The electro-optical distance meter according to claim 1, wherein said arithmetic control unit produces an abnormal signal in a case where the difference between said precise measurement distance value and said coarse measurement distance value is not within a predetermined range.

* * * * *